310-369 SR
XR 3,345,588
CROSS REFERENCE SEARCH ROOM

ANNULAR PIEZOELECTRIC FILTER WITH ARCUATE ELECTRODES

Filed Nov. 12, 1964 2 Sheets-Sheet 1

INVENTOR
JOHN CHESNEY
BY James and Franklin
ATTORNEYS

ANNULAR PIEZOELECTRIC FILTER WITH ARCUATE ELECTRODES

Filed Nov. 12, 1964 2 Sheets-Sheet 2

INVENTOR
JOHN CHESNEY
BY James and Franklin
ATTORNEYS

United States Patent Office 3,345,588

Patented Oct. 3, 1967

3,345,588
ANNULAR PIEZOELECTRIC FILTER WITH ARCUATE ELECTRODES

John Chesney, Roselle Park, N.J., assignor to General Instrument Corporation, Newark, N.J., a corporation of New Jersey Filed Nov. 12, 1964, Ser. No. 410,643
6 Claims. (Cl. 333—72)

ABSTRACT OF THE DISCLOSURE

The filter comprises a piezoelectric disc having a center hole. There is an annular metallic coating on one side of the disc, and two opposed arcuate metallic coatings on the other side of the disc. One arcuate electrode and the annular electrode serve as an input, and the other arcuate electrode and the annular electrode act as an output. The hole diameter and the electrode diameters are so proportioned that the filter has a resonance characteristic with a broadened top approaching or even having a double peaked top, and with steep sides providing a low skirt ratio. The packaging is facilitated because there is no need for maintained pressure, as with multiple discs, and the contacts bearing against the arcuate electrodes may extend radially in opposite directions to terminal posts.

This invention relates to electric wave filters, especially piezoelectric ceramic filters, and more particularly to intermediate frequency band pass filters.

It is already known that two piezoelectric elements in vibrational contact may be used as a tuned transformer, and further, that by coupling the elements together mechanically under pressure, the resonance curve may be broadened to give the unit a double tuned band pass characteristic. One object of the present invention is to provide a different and improved structure for the same purpose.

More particular objects are to accomplish the desired result with a single instead of two piezoelectric elements, and to eliminate the need for mechanical coupling by pressure.

To accomplish the foregoing general objects, and other more specific objects which will hereinafter appear, my invention resides in the piezoelectric filter and the parts thereof and their relation one to another, as are hereinafter more particularly described in the following specification. The specification is accompanied by drawings in which.

Figures 1, 2, 3, 4, 5, 6, 7, 8, 9, 10:
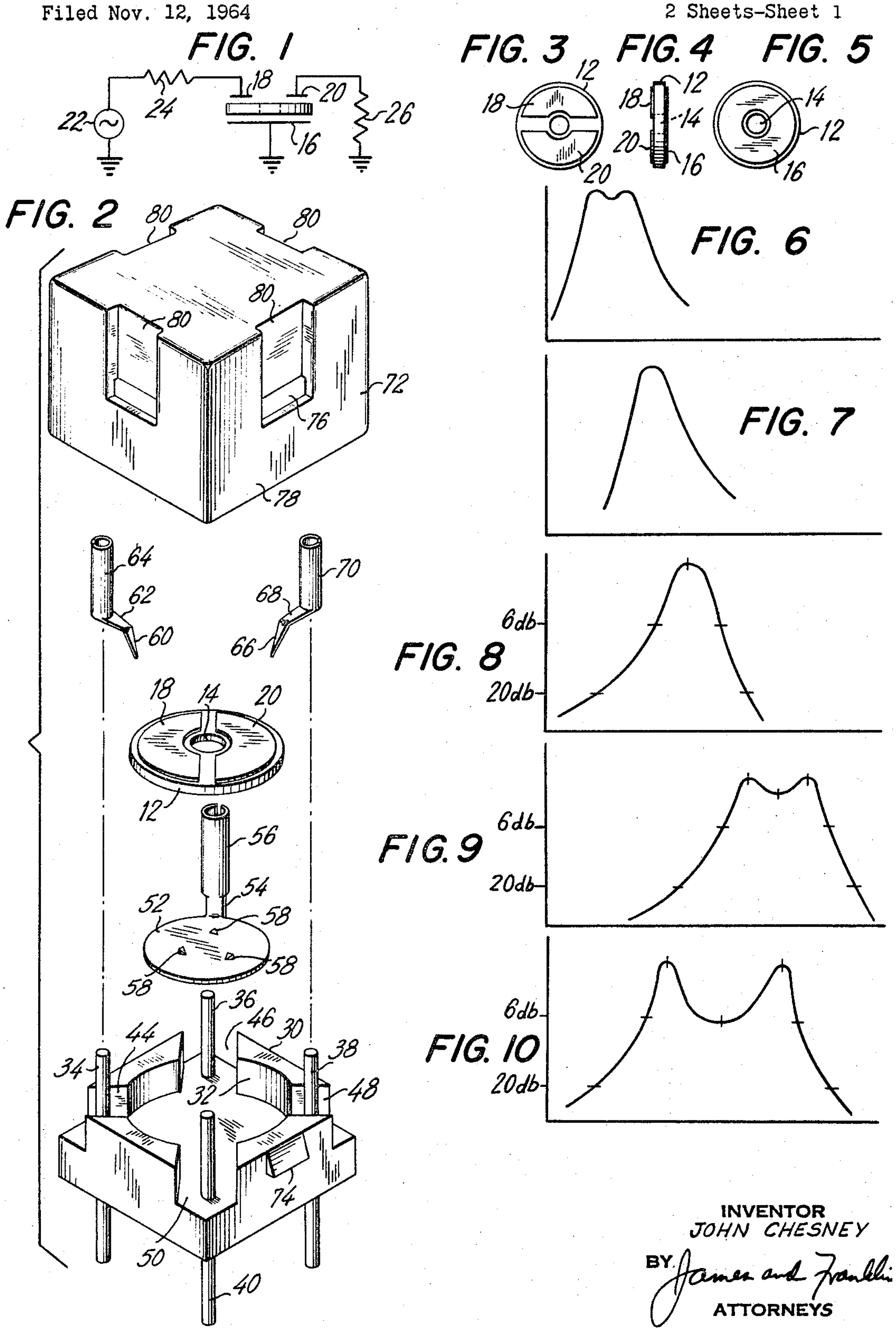
FIG. 1 is an electrical diagram explanatory of one method of using the filter.
FIG. 2 is a perspective exploded view showing the parts of a package receiving and housing the filter disc.
FIG. 3 is a plan view of the filter disc.
FIG. 4 is an edge view of the filter disc.
FIG. 5 is a bottom view of the filter disc.
FIGS. 6–10 are resonance curves showing changes in the frequency characteristics of the filter disc with changes in dimension.

Referring to the drawing, and more particularly to FIGS. 3, 4 and 5, the filter comprises a single piezoelectric disc 12. This is preferably a ceramic disc and it has a center hole therethrough, indicated at 14. There is an annular conductive electrode 16 on one side of the disc. This may be silver or other such metallic coating applied directly to the ceramic disc, and suitably treated, as by baking the same in accordance with known techniques.

There are two opposed arcuate metallic coatings 18 (FIG. 3) and 20, forming electrodes on the other side of the disc. These similarly may be baked silver or other such metallic coating.

Referring now to the electrical diagram of FIG. 1, it will be seen that one of the arcuate electrodes (in this case the electrode 18) and the annular electrode 16 serve as an input. The other arcuate electrode 20 and the annular electrode 16 serves as an output. A supply source 22 is connected to the input through a resistor 24, and the output is shown applied across a resistor 26. In the circuit here illustrated, the common side of the filter is grounded.

The filter disc of FIGS. 3–5 may be housed or packaged in varied ways. One suitable package is illustrated in FIG. 2, in which the package comprises a molded insulation base 30, this being square and having a circular recess 32. Short stiff wire inserts 34, 36 and 38 are molded in three corners of the base, and for convenience and symmetry a fourth wire 40 may be molded in the fourth corner. The lower ends of the wires project downward beneath the base to act as terminals. The upper ends of the wires project above the base to act as corner posts.

The base has diagonal passages 44, 46, 48 and 50 running from the circular recess 32 to the posts.

A bottom contact 52 may be made of sheet metal, and is dimensioned to be received in the recess, and it has a tail 54 extending radially to one of the posts (in this case the post 36) and an additional part or tail extension 56 which extends upward along the post 36. The part 56 may be flat and soldered to the post, or it may be tubular and slid around the post and then compression-welded to the post by means of an appropriate tool. If desired, the part 56 may be soldered instead of compression-welded to the post.

The piezoelectric ceramic filter disc 12 is next received in the recess and rests on the contact 52, the annular coating being at the bottom. If desired, the contact disc 52 may have a plurality (preferably three) contact points 58 struck upward therefrom.

There is also a contact 60 bearing against the arcuate electrode 18 and extending radially at 62 through passage 44, and then upward at 64 along the post 34. Here again, electrical contact is assured by either compression-welding or soldering. Another like contact 66 bears against the other arcuate electrode 20 and extends radially at 68 through passage 48 and then upward at 70 along the post 38. As before, electrical connection and maintenance of downward contact pressure against the electrode is assured by compression-welding or soldering.

If desired, the points 60 and 66 could be soldered to the electrodes 18 and 20. Alternatively, short pieces of wire could be soldered to the electrodes at one end, and to the posts at the other end. In general, the packaging is not important, it being necessary only to provide three leads from the three electrodes.

A molded plastic cover 72 is received over the posts and the base 30. The cover might be cemented to the base, but preferably (and as here shown) it fits over and around the base with a snap fit. More specifically, the base 30 has an outwardly projecting detent 74 which forms a part of the base and which passes through a mating opening 76 in the cover 72. There are preferably two such detents on opposite sides. The lower part 78 of the cover fits around the base and expands or yields slightly as the cover is pushed down over the detents. The downward motion of the cover is limited by inwardly displaced parts or channels 80, the lower ends of which bear against the top of the base. In the form here shown, there are four inwardly displaced parts, and four openings, so that the cover may be applied to the base in any of four positions.

The cover 80 may be made of polyethylene or other plastics material because only a slight yielding at skirt 78 is needed for the snap engagement. The base 30 may be made of an alkyd resin or a phenolic resin. One of the stable thermosetting resins is preferred.

The disc 12 is preferably a ceramic material which is time and temperature stable with respect to its elastic, dielectric, and piezoelectric properties. This stability may be achieved by proper composition and processing. The ceramic material may be based on barium titanate, or lead titanate and lead zirconate, or on lead stannate, or may be based on niobate and metaniobate systems.

It will be understood that the disc may be packaged in inverted position, the contacts 60 and 66 then being located at the bottom and bent upward, and the contact 52 being located at the top with its points struck downward.

The filter characteristics of the present piezoelectric filter may be described with reference to the resonance curves shown in FIGS. 6–10. In FIG. 6, the disc had an O.D. (outside diameter) of 0.341 inch, and a hole diameter of I.D. of 0.083 inch. In this and in all cases (FIGS. 6–10) the disc had a thickness of 0.027 inch. With reference to FIG. 1, the resistors 24 and 26 were one thousand ohms, and the input was one volt. The resonance curve shown in FIG. 6 is broadened at the top and has the typical double peak of a double tuned circuit, much as though using two LC circuits or two piezoelecrtic discs in vibrational contact under pressure.

For band pass filter purposes (for example, for the I.F. circuit of an AM radio receiver), it is desirable to not only broaden the peak of the resonance curve to provide a band width in a range of say 10 kc. to 14 kc., but also to provide relatively steep sides; or, differently expressed, a low skirt ratio. The skirt ratio is the ratio of the band width at 20 db down from the peak, compared to the band width at 6 db down from the peak.

In FIGS. 6–10 the curves are not drawn to scale, but they do show the trends.

In FIG. 6 the voltage at the peak is 0.42 volt. The mid frequency is 221 kc.

In FIG. 7, the I.D. was unchanged, but the O.D. was reduced from 0.341 to 0.322 inch. The peaks coalesce to a single peak, with a higher midfrequency of 233 kc.

It is found that in general the frequency increases with a decrease in O.D. when maintaining the same I.D. Thus, with an O.D. of 0.310 inch, the midfrequency was 241 kc., and with an O.D. of 0.298 inch the midfrequency was 249 kc.

The last two cases are not illustrated because they were not usable as a practical matter, the output voltage dropping to 0.167 volt in the earlier case, and then dropping to 0.060 volt or almost zero coupling in the last case. The latter seems to be a critical dimension beyond which the output voltage again rises and the coupling again becomes usable.

When the O.D. of the disc was further decreased to 0.291 inch, the resonance curve was that shown in FIG. 8; and when the O.D. was decreased to 0.275 inch, the resonance curve was that shown in FIG. 9. The midfrequency in FIG. 8 was 251 kc., and the midfrequency in FIG. 9 was 266 kc. Thus, a progressive reduction in O.D. caused a consistent progressive increase in midfrequency value, the hole diameter being unchanged.

In FIG. 7 the output voltage was 0.35 volt, and in FIG. 8 the output voltage was 0.39 volt, and in FIG. 9 the output voltage was 0.37 volt, all of which would be usable.

It will be seen that double peaks were formed in FIG. 9, so that the progression from FIG. 6 through FIG. 9 represents a kind of mirror image, on either side of a critical dimension in which the coupling falls almost to zero and is unsatisfactory.

In FIG. 8, the frequencies at a drop of 6 db were 246 kc. and 258 kc., and the frequencies at a drop of 20 db were 234 kc. and 261 kc. This gives a skirt ratio of 2.2.

In FIG. 9, the peak frequencies were 260 kc. and 271 kc. At a drop of 6 db the frequencies were 255 kc. and 274 kc. At a drop of 20 db the frequencies were 242 kc. and 279 kc., providing a skirt ratio of slightly less than 2.

FIG. 10 shows the frequency characteristic for a disc in which the O.D. was retained at 0.275 inch (as in FIG. 9), and in which the I.D. was increased to 0.090 inch. In this case, the midfrequency decreased to 261 kc., showing that the frequency goes down with an increase in hole size. The frequency goes up with a decrease in O.D. for a constant I.D.; and the frequency goes down with an increase in I.D. for a constant O.D.

In connection with these curves, it should be understood that they can be varied not only by a change in the physical dimension of the filter disc, but also by the parameters of the surrounding circuitry. Thus, in FIG. 1, if the resistors 24 and 26 are increased from a value of 1 k. to say 5 k. or 10 k., there is a tendency toward double peaks. More specifically, in FIG. 8 two peaks may be formed instead of one, and in FIG. 9 the valley between the peaks would be widened and deepened.

In FIG. 10, the peak frequencies were 250 kc. and 272 kc. The output voltage was 0.34 volt. At a drop of 6 db the frequencies were 248 kc. and 275 kc. At a drop of 20 db the frequencies were 232 kc. and 282 kc. This gives a low skirt ratio of 1.85.

In a practical case, for example for automobile radios, the midfrequency of the filter would desirably be 262.5 kc. For home radios, the I.F. frequency usually is 455 kc. The present filter may be used for either purpose, by appropriate physical dimension and suitable associated component values. The quantitative examples given above indicate the direction of change for design purposes. However, it may be noted that the examples illustrated in FIGS. 9 and 10 approach the requirements for an automobile radio in respect to adequate output, correct midfrequency, and low skirt ratio, and would need little change.

One example of disc dimension which provides a center frequency of 455 kc. is a small disc having an O.D. of 0.162 inch and an I.D. of 0.045 inch, the thickness being 0.026 inch.

In all cases it will be understood that any quantitative values given have been given by way of example, rather than in limitation of the invention.

Figure 11:
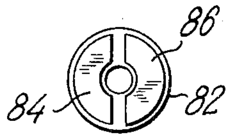
FIGS. 11–13 show a modified filter disc.
Figure 12:
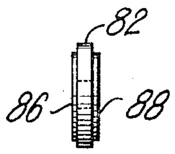
Figure 13:
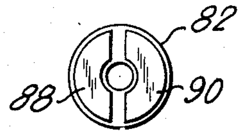

As so far described the filter disc has a full annular electrode on one side, which is convenient when the input and output circuits are connected or are grounded. However, there are cases in which it may be desired to electrically isolate the input and output circuits, and in such case the filter disc may be provided with four arcuate electrodes. Such an arrangement is shown in FIGS. 11, 12 and 13 in which the top of disc 82 has arcuate electrodes 84 and 86 (FIG. 11). The bottom of the disc has arcuate electrode 88 and 90 (FIG. 13). It will be understood that these are in registration or superposed, that is, the diametrical separation extends in the same direction on both sides of the disc.

The disc of FIGS. 11–13 may be used in the circuit of FIG. 1, the bottom electrodes then being joined. For all practical purposes it may be said that the two arcuate electrodes on the bottom constitute an annular electrode. Differently expressed, it could be said that in FIG. 1 there are four arcuate electrodes, with the two bottom electrodes joined. However in this description I refer to an annular electrode, which in FIGS. 11–13 is divided.

Figure 14:
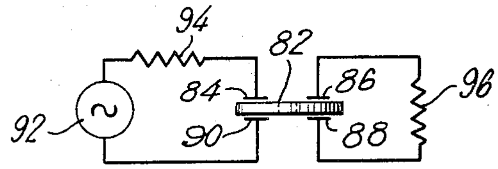
FIG. 14 is an electrical diagram for the modified disc.

An advantage of the disc shown in FIGS. 11–13 with its divided annular electrode is that the input and output circuits may be isolated as shown in FIG. 14, in which the input source is indicated at 92, and is connected to two superposed arcuate electrodes through a resistor 94. The other two electrodes are connected to an output or load impedance 96. This affords greater flexibility in respect to the circuitry, and the phase relation between input and output, as well as the presence or absence of and the location of one or more ground connections.

Figure 15:
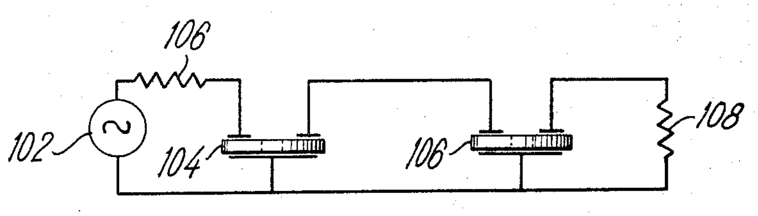
FIG. 15 shows a circuit using multiple filter discs.

The filter discs may be used in multiple instead of singly, that is, two or more discs may be combined. One such circuit is illustrated in FIG. 15, referring to which the supply source 102 is coupled to the input side of a filter disc 104 through a resistor 106. The output side of filter disc 104 is connected to the input side of another filter disc 106, and the output side of the latter filter disc is connected to an output or load impedance 108. Other and more complex circuits may be provided utilizing a plurality of filter discs. The filter disc of FIGS. 11–13 also may be used in multiple.

A packaging for the disc of FIGS. 11–13 is not illustrated, and may take any desired form, the only requirement being the provision of four leads to the four electrodes. The packaging of FIG. 2 may be adapted for the purpose because there are four posts at the four corners of the base, and two opposite posts may hold two contacts which bear upwardly against the two bottom electrodes, and the diagonally opposed two posts may hold two contacts which bear downwardly against the two electrodes on top of the disc.

It is believed that the construction and method of use of my improved piezoelectric filter, as well as the advantages thereof, will be apparent from the foregoing detailed description. A single piezoelectric disc is made equivalent to a double tuned circuit instead of a single tuned circuit. This halves the number of discs needed, and equally important, eliminates a troublesome variable heretofore encountered, namely, variable pressure when using stacked discs. That variable is eliminated in the present filter.

It will be understood that while I have shown and described the invention in several preferred forms, changes may be made without departing from the scope of the invention, as sought to be defined in the following claims. In the claims the reference to an annular electrode on one side of the disc is not intended to exclude the use of two opposed arcuate electrodes which are in registration with the arcuate eletcrodes on the other side of the disc, as explained above.

I claim:

1. A piezoelectric filter comprising a piezoelectric disc having a center hole, an annular conductive electrode on one side of said disc, two opposed arcuate conductive electrodes on the other side of said disc, one of said arcuate electrodes and said annular electrode serving as an input, and the other of said arcuate electrodes and said annular electrode acting as the output, the hole and electrode diameters being so proportioned that said filter has a resonance characteristic with a broadened top approaching a double peaked top and a low skirt ratio.

2. A piezoelectric filter as defined in claim 1 in which the annular electrode is divided to form two opposed arcuate electrodes, the arcuate electrodes on both sides being superposed.

3. A piezoelectric filter comprising a piezoelectric ceramic disc having a center hole, an annular metallic coating forming an electrode on one side of said disc, two opposed arcuate metallic coatings forming electrodes on the other side of said disc, one of said arcuate electrodes and said annular electrode serving as an input, and the other of said arcuate electrodes and said annular electrode acting as the output, the hole and electrode diameters being so proportioned that said filter has a resonance characteristic with a broadened top approaching a double peaked top and a low skirt ratio.

4. A piezoelectric filter as defined in claim 3 in which the annular electrode is divided diametrically to form two opposed arcuate electrodes, the diametrical division being in the same direction as the separation of the arcuate electrodes on the other side of the disc, whereby the arcuate electrodes on both sides are superposed.

5. A piezoelectric filter comprising a molded insulation base, said base having a recess, and short stiff wire inserts molded in three corners of said base, the lower ends of said wires projecting downward beneath the base to act as terminals, the upper ends of said wires projecting above the base to act as corner posts, said base having passages from the recess to the posts, a bottom contact in said recess and having a tail extending radially to and upward along a first post, a piezoelectric disc in said recess and resting on said contact, said disc having a center hole, an annular metallic coating forming an electrode in the bottom of said disc, two opposed arcuate metallic coatings forming electrodes on the top of said disc, a contact bearing against one arcuate electrode and extending radially to and upward along a second post at one side of the aforesaid first post, a contact bearing against the other arcuate electrode and extending radially in opposite direction to and upward along a third post opposite the second post, and a molded plastic cover received over said posts and base the hole and electrode diameters of the filter being so proportioned that the filter has a resonance characteristic wtih a broadened top approaching a double peaked top and a low skirt ratio.

6. A piezoelectric ceramic filter comprising a molded insulation base, said base being square and having a circular recess, and short stiff wire inserts molded in the corners of said base, the lower ends of said wires projecting downward beneath the base to act as terminals, the upper ends of said wires projecting above the base to act as corners posts, said base having diagonal passages from the circular recess to the posts, a bottom contact in said recess and having a tail extending radially to and upward along a first post, a piezoelectric ceramic disc in said recess and resting on said contact, said disc having a center hole, an annular metallic coating forming an electrode on the bottom of said disc, two opposed arcuate metallic coatings forming electrodes on the top of said disc, a contact bearing against one arcuate electrode and extending radially to and upward along a second post at one side of the aforesaid first post, a contact bearing against the other arcuate electrode and extending radially in opposite direction to and upward along a third post opposite the second post, and a molded plastic cover received over said posts and base, the hole and electrode diameters of the filter being so proportioned that the filter has a resonance characteristic with a broadened top approaching a double peaked top and a low skirt ratio.

References Cited

UNITED STATES PATENTS

| | | | |
|---|---|---|---|
| 3,176,251 | 3/1965 | Kuenzig | 333—72 |
| 3,189,851 | 6/1965 | Fowler | 333—72 |
| 3,222,622 | 12/1965 | Curran et al. | 333—72 |
| 3,299,301 | 1/1967 | Heilmann et al. | 333—72 |

ROY LAKE, *Primary Examiner.*

DARWIN R. HOSTETTER, *Examiner.*